United States Patent Office 2,714,614
Patented Aug. 2, 1955

2,714,614

SUBSTITUTED AMINODIPHENYLAMINES

Viktor Weinmayr, Pitman, N. J., assignor to E. I. du Pont de Nemours & Company, Wilmington, Del., a corporation of Delaware No Drawing. Application April 20, 1951,
Serial No. 222,157

12 Claims. (Cl. 260—571)

This invention relates to a process for the manufacture of aminodiphenylamines having the structure:

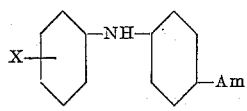

in which X represents an alkoxy or alkyl radical and Am represents an amino group, which may contain alkyl, aryl or alkaryl substituents.

Aminodiphenylamines of this type are important technical products having many uses in the chemical field. However all known processes for their manufacture involve numerous and costly steps and frequently require expensive starting materials. For instance, 4-amino-4'-methoxydiphenylamine is a widely used intermediate for a series of azoic blue colors and is commonly known as Variamine Blue B Base. In one of the technical processes for its manufacture, 4-chloronitrobenzene-3-sulfonic acid is condensed with p-anisidine to give 4-methoxy-4'-nitrodiphenylamine-2'-sulfonic acid and this compound is reduced to 4-methoxy-4'-aminodiphenylamine-2'-sulfonic acid. The product is then desulfonated to give 4-amino-4'-methoxydiphenylamine. Not only are several steps required in this synthesis, but also undesirable side reactions such as demethylation take place, particularly during the desulfonation operation.

Bamberger in Annalen 311, page 84 (footnote) (1900) reported that aminodiphenylamine was formed when phenylhydroxylamine was reacted at room temperature with aniline in a 20 percent solution of aluminum sulfate in water. However, when p-anisylhydroxylamine is reacted with aniline hydrobromide dissolved in methanol, 4,4'-dimethoxyazoxy benzene is obtained. No 4-amino-4'-methoxydiphenylamine is formed under these conditions.

It is an object of this invention to provide a process by which 4-amino-4'-methoxydiphenylamine and other similar 4-aminodiphenylamines can be made in one step starting from cheap intermediates and by familiar chemical operations.

According to the present invention, 4-aminodiphenylamines are prepared by hydrogenating a mixture of a substituted aromatic nitrobody or hydroxylamine and a phenylamine in an acid solution and in the presence of a hydrogenation catalyst. The phenylamine may be added in the form of the free amine or as one of its mineral acid salts.

In a typical operation, an alcoholic solution of a nitrobody, such as p-nitroanisole, and an amine in the form of its salt, such as aniline hydrobromide, is hydrogenated in the presence of an acid resistant catalyst, such as palladium on activated charcoal. As soon as the hydrogenation has begun, a condensation between the amine and some reduction product of the nitrobody takes place with the formation of the desired substituted diphenylamine, in this case 4-amino-4'-methoxydiphenylamine. The product may be isolated in various ways, as for example by conversion to the free base followed by distillation, or by precipitation as a poorly soluble salt of a mineral acid. The reaction proceeds smoothly giving as by-products only amines corresponding to the nitrobodies. These amines, such as p-anisidine, are in themselves valuable compounds. They and some of the unreacted amine starting materials can readily be recovered from the reaction mass. Undesirable tarry by-products are, as a rule, not formed or are formed in amounts which are essentially negligible.

The process is illustrated by the following examples, in which all parts are by weight:

*Example 1*

A charge of 160 parts of methanol, 92 parts of p-nitroanisole, 104 parts of aniline hydrobromide, and 6 parts of palladium catalyst (3% palladium on charcoal) is hydrogenated with a hydrogen pressure of 20–50 p. s. i. The heat of reaction developed in the charge is sufficient to raise the temperature to 80° C. for a time, after which it gradually falls. Air cooling alone is employed. The reaction is stopped when no more hydrogen is absorbed as noted by the absence of any further pressure drop. The charge temperature also begins to drop when the reaction is finished. The hydrogenation is complete in two hours.

The alcoholic solution is filtered from the catalyst and the latter is washed with several parts of methanol. The light brown alcoholic filtrate is poured into 500 parts of water and the mixture is made slightly alkaline to brilliant yellow paper with ammonia. The oily precipitate which forms is dissolved in 500 parts of benzene. The benzene solution is washed once with cold water and then dried with sodium sulfate and filtered.

For purification the solution is distilled. First, most of the solvent is removed by heating the charge in a distilling flask until the temperature of the charge has risen to 240° C. Vacuum is then applied and aniline and p-anisidine are recovered. Finally, 84 parts of 4-amino-4'-methoxydiphenylamine distills at 190–200° C. and a pressure of 2 mm. Upon crystallization from benzene and a high boiling fraction of petroleum ether, it is obtained with a melting-point of 99° C. Its constitution is confirmed by analysis, and by the typical blue color in sulfuric acid containing traces of sodium nitrite.

*Example 2*

A charge of 840 parts of methanol, 200 parts of p-nitroanisole, 208 parts of aniline hydrochloride, and 12 parts of palladium catalyst is hydrogenated at 20–50 lbs. hydrogen pressure at 50–70° C. After the hydrogen absorption has stopped, the charge is filtered, poured into about 8000 parts of water, and made alkaline with diluted caustic. The oil is separated and the water is extracted with 2000 parts of benzene. The benzene layer and the oil are combined and washed with water. The benzene solution is dried with calcium chloride, filtered and distilled. Aniline and p-anisidine are recovered first. The 4-amino-4'-methoxydiphenylamine (91 parts) distills at 200° C. and a pressure of 2–3 mm. Upon crystallization from benzene and petroleum ether it is obtained with a melting-point of 99–100° C.

*Example 3*

A charge of 80 parts of methanol, 25 parts of p-nitroanisole, 29 parts of aniline sulfate and 1.5 parts of palladium catalyst is hydrogenated at 62–85° C. and a hydrogen pressure of 10–50 p. s. i. As the formation of the 4-amino-4'-methoxydiphenylamine progresses, it precipitates as the difficultly soluble half sulfate. When the reaction is finished, as indicated by the cessation of further hydrogen consumption, the charge is filtered and washed with methanol. The 4-amino-4'-methoxydiphenylamine sulfate thus obtained is slurried in water containing sulfuric acid to remove the excess of the p-anisidine sulfate and the aniline sulfate. The resulting difficultly water soluble 4-amino-4'-methoxyamino sulfate may be used as an intermediate for dyes without further purification. The catalyst may be recovered at suitable stages during the further processing.

*Example 4*

Twenty-nine (29) parts of 36% aqueous hydrochloric acid are added to a solution of 23 parts of aniline and 31 parts of p-nitroanisole in 80 parts of methanol. After the addition of 2 parts of palladium catalyst, the charge is hydrogenated at 25–50° C. until the hydrogen absorption has stopped. The alcoholic solution is filtered from the catalyst and diluted with aqueous ammonia until alkaline to brilliant yellow paper. The oil which separates is dissolved in 500 parts of benzene, washed, dried and distilled. After the solvent has been recovered, the unreacted aniline and then the p-anisidine are distilled over. The 4-amino-4'-methoxydiphenylamine distilling at 210° C. at 4 mm. pressure is obtained in 35% yield.

*Example 5*

This hydrogenation involves the use of hydrogen fluoride and is, therefore, run in a flask coated with an acid resistant plastic coating. Six (6) parts of anhydrous hydrogen fluoride free of even traces of sulfur dioxide are added to a solution of 31 parts of p-nitroanisole and 23 parts of aniline in 80 parts of methanol. After the addition of 2 parts of palladium catalyst, the charge is hydrogenated at 30–50 p. s. i. of hydrogen pressure until no more hydrogen is absorbed. The reaction takes place very quickly at 15–25° C. Two of the above charges are combined for distillation. The free amines are isolated by adding dilute aqueous potassium hydroxide to the alcoholic filtrate. The amines are dissolved in benzene, washed, dried and filtered in the usual manner. After the solvent, aniline, and p-anisidine have been recovered, 30 parts of 4-amino-4'-methoxydiphenylamine are obtained distilling at 180–195° C. at a pressure of 1–2 mm. After one crystallization from a high boiling gasoline it melts at 99° C.

*Example 6*

A charge of 40 parts of aluminum sulfate crystals, 31 parts of p-nitroanisole, 19 parts of aniline, and 2 parts of palladium catalyst in 150 parts of water is hydrogenated at 55–60° C. and at a pressure of 20–40 p. s. i. of hydrogen. The charge forms a thick slurry of white crystals when the hydrogen absorption stops. It reacts neutral to Congo red paper. The reaction mass is made strongly acidic with sulfuric acid. The resulting solution is heated to about 90° C. and then is filtered from the catalyst residue while still hot. Heavy crystallization develops in the filtrate. The filtrate is heated until a solution results and then is made just barely acidic to Congo red paper by neutralizing the excess acid with ammonia. The charge is then cooled to about 10° C. and the crystalline precipitate is filtered. It is then slurried in 1200 parts of cold water to remove the soluble aniline sulfate and p-anisidine sulfate, leaving behind the sulfate of the 4-amino-4'-methoxydiphenylamine. This is filtered, washed and stirred in 800 parts of water containing enough ammonia to show a strong test with brilliant yellow paper. Crystalline 4-amino-4'-methoxydiphenylamine is obtained (4 parts) melting at 95° C. without purification by crystallization. Aniline and p-anisidine are recovered from the acidic layers removed from the condensation product.

*Example 7*

Ten (10) parts of aniline and 15.3 parts of p-nitroanisole are added to 75 parts of 85% phosphoric acid. The charge is hydrogenated using platinum oxide as the hydrogenation catalyst. Due to poor solubility of the materials, hydrogenation proceeds slowly but constantly over a period of 16 hours at 75–80° C. and a pressure of 30–50 p. s. i. of hydrogen. When the hydrogen absorption has stopped, the reaction mass is cooled to 30° C. where it forms a thick slurry of crystals. Tests show that the mass contains 4-amino-4'-methoxydiphenylamine.

*Example 8*

Eight hundred (800) parts of methanol, 188 parts of p-nitroanisole and 450 parts of aniline hydrochloride are charged into a nickel autoclave. Ten (10) parts of palladium catalyst are added and 600 p. s. i. of hydrogen pressure is applied until hydrogen is no longer consumed. The hydrogen absorption proceeds rapidly at a charge temperature of 50–70° C. and is completed in one hour. The alcoholic solution is filtered from the catalyst and is evaporated to dryness after the addition of enough hydrochloric acid to convert all amines to hydrochlorides. These solids are then slurried in dilute ammonia and dissolved in benzene. After the usual washing, drying and filtering, the compounds dissolved in the benzene are separated by distillation. Sixty (60) parts of 4-amino-4'-methoxydiphenylamine are obtained distilling at 190–200° C. at a pressure of 2 mm.

*Example 9*

A charge of 80 parts of methanol, 31 parts of p-nitroanisole, 40 parts of p-anisidine hydrochloride, and 2 parts of palladium catalyst is hydrogenated at 28–52° C. under 10–55 p. s. i. of hydrogen. The hydrogen absorption stops after a period of eight hours. The charge is filtered, the catalyst residue is washed with methanol and then with 50 parts of water containing 15 parts of 36% hydrochloric acid. The filtrate and wash are combined and the methanol is recovered by distillation under reduced pressure. The distillation residue is slurried in 200 parts of water containing 45 parts of 28 percent aqueous ammonia. The oily precipitate is dissolved in 300 parts of benzene, the solvent layer is washed with water, dried and distilled. Forty (40) parts of p-anisidine are recovered, equal to 72 percent of the p-anisidine charged and p-anisidine that could have been obtained from the p-nitroanisole charged. The yield of 4-amino-4'-methoxydiphenylamine distilling at 200° C. at a pressure of 2–3 mm. is 9 parts, equal to 20.8% of theory based on the p-nitroanisole charged. The product melts at 99° C. after one crystallization from a mixture of benzene and petroleum ether and is identical with the 4-amino-4'-methoxydiphenylamine obtained according to the preceding examples. The condensation has thus taken place with the elimination of the methoxy group from the p-anisidine hydrochloride.

*Example 10*

Thirty (30) parts of concentrated hydrochloric acid and 2 parts of palladium catalyst are added to a solution of 45 parts of p-nitroanisole in 150 parts of pyridine. Hydrogenation proceeds rapidly at 60–65° C. and a pressure of 20–45 p. s. i. of hydrogen. Some 4-amino-4'-methoxydiphenylamine is present in the reaction mass as shown by its color reaction in concentrated sulfuric acid containing traces of sodium nitrite.

*Example 11*

A charge of 100 parts of p-nitroanisole, 200 parts of methanol, 5 parts of 36% hydrochloric acid and 2 parts of palladium catalyst is hydrogenated at 500–600 p. s. i. hydrogen pressure at 50–70° C. When the hydrogen absorption has stopped, enough caustic is added to the charge to neutralize the hydrochloric acid. The reaction product is dissolved in benzene, filtered from the catalyst and distilled to recover the p-anisidine. Upon further distillation at a pressure of 2 mm., 20 parts of 4-amino-4'-methoxydiphenylamine are obtained.

*Example 12*

To a solution of 46 parts of p-nitroanisole and 45 parts of N-n-butylaniline in 80 parts of methanol are added 30 parts of concentrated hydrochloric acid and 3 parts of palladium catalyst. The charge is hydrogenated at 50–55° C. and a pressure of 30–50 p. s. i. of hydrogen. When the hydrogen absorption is complete, the catalyst is recovered by filtration and the filtrate is poured into 200 parts of water containing enough hydrochloric acid to convert all amines to hydrochlorides. The methanol is recovered by distillation and 80 parts of 30% caustic solution are added. The oil which separates is taken up in 300 parts of benzene. The benzene solution is washed, dried, filtered and distilled. Para-anisidine and unreacted N-n-butylaniline are recovered by distilling at a pressure of 45 mm. Upon further distillation at 2 mm. and 205–210 C., 25 parts of 4-n-butylamino-4'-methoxydiphenylamine are obtained, equal to a yield of 31% of theory based on p-nitroanisole. The product crystallizes readily from a fraction of gasoline having a boiling point of about 120° C. Pure 4-n-butylamino-4'-methoxydiphenylamine melts at 69–70° C.

*Example 13*

A charge of 90 parts of n-butyl alcohol, 46 parts of p-nitroanisole, 45 parts of N-n-butylaniline and 30 parts of 36% hydrochloric acid is hydrogenated in the presence of palladium catalyst. The hydrogenation goes quickly to completion at 55–60° C. and a hydrogen pressure of 20–40 p. s. i. The alcoholic solution of the reaction products is filtered from the catalyst residue and is poured into 1000 parts of water containing 60 parts of 30% caustic. The oil which precipitates is dissolved in 180 parts of benzene, and the benzene solution is washed caustic-free, dried with sodium sulfate, filtered and distilled. Thirteen (13) parts of 4-n-butylamino-4'-methoxydiphenylamine distilling between 195–205° C. at a pressure of 1–2 mm. are obtained. The product solidifies readily when seeded with crystals prepared according to the preceding example.

*Example 14*

A condensation is carried out in a shaker bomb made of steel. The bomb is well cooled with Dry Ice before adding the charge. Thirty (30) parts of water, 31 parts of boric acid, 168 parts of p-nitroanisole, 85 parts of freshly distilled diphenylamine, and 5 parts of palladium catalyst are then added and allowed to cool for thirty minutes. One hundred twenty (120) parts of anhydrous hydrogen fluoride free of sulfur dioxide are then added and the charge is hydrogenated at 40–50° C. and a pressure of 200–300 p. s. i. of hydrogen. After a reaction time of nine hours, the pressure remains constant, indicating that reaction has ceased. The bomb is cooled in ice, the pressure is released and the contents of the bomb are poured into 500 parts of cold water. The dilution mass is made almost neutral to Congo red with about 150 parts of 28% ammonia, and the reaction product is dissolved in 1000 parts of benzene. The benzene solution is filtered to remove the catalyst, and washed with water, dried and distilled. Seventy-one (71) percent of the diphenylamine used is recovered unchanged and is suitable for re-use. Upon further distillation 34 parts of N-phenyl-N'-p-methoxyphenyl phenylene diamine distilling between 250–300° C. at a pressure of 3 mm. are obtained. This equals a yield of 23% of theory based on the amount of diphenylamine charged or 79% based on the amount of diphenylamine consumed in the reaction. The product as obtained melts at 121° C. The final melting point is determined to be 126° C. when the product is crystallized from methanol until the melting point does not change further.

*Example 15*

A charge of 168 parts of p-nitroanisole, 85 parts of freshly distilled diphenylamine, 30 parts of water and 5 parts of palladium catalyst is cooled with Dry Ice in a steel shaker bomb. One hundred twenty (120) parts of anhydrous hydrogen fluoride which has been treated with manganese dioxide at 80° C. to remove all traces of sulfur dioxide, according to the process claimed in my copending application Serial No. 236,684, filed July 13, 1951, are then added and the charge is hydrogenated at 40° C. and a pressure of 200–300 p. s. i. of hydrogen. The hydrogenation is complete in six hours. The contents of the bomb are poured into 700 parts of cold water and 150 parts of 28% aqueous ammonia is added to reduce the acidity to just weakly acid to Congo red. The reaction product is then dissolved in 750 parts of benzene. The benzene solution is filtered from the catalyst residue and separated from the dilute acid layer. This acid layer is made alkaline with ammonia and cooled to below 10° C. to allow the p-anisidine to crystallize out. Eighty-eight (88) parts of p-anisidine are thus obtained equal to 65% of that which could have been obtained if all of the p-nitroanisole had been reduced to p-anisidine. The benzene solution is washed, dried and distilled. Diphenylamine, to the extent of 81% of the amount charged, is recovered first. Distilling between 200–290° C. at about a 3 mm. pressure gives 20 parts of N-phenyl-N'-p-methoxyphenyl phenylene diamine, equal to a yield of 13.8% based on the amount of diphenylamine charged, or 71.4% based on the amount of diphenylamine consumed in the reaction. After a crystallization from methanol (20 parts in 500 parts of solvent) the product melts at 125–126° C.

*Example 16*

A charge of 124 parts of anhydrous hydrogen fluoride which contains no sulfur dioxide, 168 parts of p-nitroanisole, 85 parts of diphenylamine, and 8 parts of palladium catalyst is hydrogenated at 60–70° C. and a pressure of 500–600 p. s. i. of hydrogen. The hydrogenation is complete in one hour. The contents of the bomb are poured into 2000 parts of ice and water and the dilution mass is made almost neutral to Congo red with 160 parts of 28% ammonia. The grey, crystalline precipitate is filtered and washed nearly acid-free with cold water. Para-anisidine is recovered from the filtrate and the wash water. The filter cake is dried on a steam bath and weighs 90 parts. It is slurried in 2000 parts of water, the slurry is made alkaline with caustic and the reaction product is dissolved in 700 parts of benzene. Upon distillation, 53 parts of diphenylamine are recovered and 6 parts of N-phenyl-N'-p-methoxyphenyl phenylene diamine are obtained distilling at 260–270° C. The product melts at 120° C. as obtained, and at 125° C. after a crystallization from methanol.

*Example 17*

A charge of 200 parts of methanol, 76 parts of p-nitroanisole, 90 parts of N-diethylaniline, 60 parts of 36% aqueous hydrochloric acid and 4 parts of palladium catalyst is hydrogenated at 65° C. and a pressure of 20–45 p. s. i. of hydrogen. The hydrogenation is complete in about eight hours. The reaction mass is filtered from the catalyst, diluted with water and made slightly alkaline with ammonia. The reaction product which separates is dissolved in benzene, and the benzene solution is washed with water, dried, filtered and distilled. The benzene, p-anisidine, and unreacted N-diethylaniline are recovered by distillation. Upon further distillation, there are obtained 36 parts of 4-N-diethyl-amino-4'-methoxydiphenylamine at 190° C. at a pressure of 1 mm. The product solidifies in the receiver and melts at 77° C. when crystallized from 65 parts of methanol.

*Example 18*

A charge of 31 parts of p-nitroanisole, 35 parts of aniline hydrobromide, 2 parts of palladium catalyst, and 100 parts of glacial acetic acid is hydrogenated at 75–80° C. and a pressure of 10–40 p. s. i. of hydrogen. The hydrogenation is finished in about fifteen hours. The charge is filtered, giving a cake which contains, in addition to the catalyst, some of the condensation product. This filter cake is washed with methanol until only the catalyst is left. The filtrate and wash are diluted with water and made alkaline to brilliant yellow with approximately 200 parts of 28% ammonia. The precipitate which forms is dissolved in benzene and purified by distillation. Aniline and p-anisidine are recovered first. At 200° C. and a pressure of 2 mm. there is recovered 5 parts of 4-amino-4'-methoxydiphenylamine.

*Example 19*

A charge of 90 parts of thiophene-free benzene, 31 parts of p-nitroanisole, 35 parts of aniline hydrobromide, and 2 parts of palladium catalyst is hydrogenated at 50–60° C. at a pressure of 15–45 lbs. of hydrogen. When the hydrogenation is complete the charge is filtered. The hydrobromide of the condensation product is essentially insoluble in the benzene and is obtained as a crystalline product together with the catalyst. After treatment with aqueous ammonia and extraction with benzene the amine is isolated by distillation. 4-amino-4'-methoxydiphenylamine is obtained.

*Example 20*

A charge of 80 parts of methanol, 31 parts of o-nitroanisole, 35 parts of aniline hydrobromide, and 3 parts of palladium catalyst is hydrogenated at 70–75° C. and a pressure of 20–48 p. s. i. of hydrogen. The hydrogen absorption has stopped after a reaction time of six hours. The reaction mass is filtered to remove the catalyst, and the filterate is diluted with 800 parts of water and made alkaline with dilute ammonia. The condensation product which precipitates as an oil is dissolved in benzene and purified by distillation. A foreshot of aniline and o-anisidine is removed first. The condensation product distills at 195–210° C. at a pressure of 3–4 mm. Ten (10) parts of crude 4-amino-2'-methoxydiphenylamine are obtained. The product is a crystalline solid and shows a strong purple color in sulfuric acid containing traces of sodium nitrite.

*Example 21*

A charge of 80 parts of methanol, 25 parts of p-nitrophenetole, 26 parts aniline hydrochloride, and 1.5 parts of palladium catalyst is hydrogenated at a pressure of 10–40 p. s. i. of hydrogen while the temperature rises during the reaction from 40° C. to 75° C. The hydrogenation is complete in ninety minutes. The catalyst is removed by filtration and the filtrate is diluted with water to about 1000 parts. At that dilution a slight turbidity develops which however disappears when a small amount of hydrochloric acid is added. The dilution mass is made alkaline with 20 parts of 28% ammonia and the oily reaction product which precipitates is separated. Twenty (20) parts of crude reaction product is thus obtained, and is purified by distillation. After a foreshot of aniline and p-phenetidine, 12 parts of 4-amino-4'-ethoxydiphenylamine distill at 210–220° C. and a pressure of 3–4 mm. The product solidifies in the receiver and melts at 99° C. after crystallization from a mixture of about 70 parts of benzene and 80 parts petroleum ether.

*Example 22*

A charge of 80 parts of methanol, 34 parts of p-nitrophenetole, 43 parts of p-phenetidine hydrochloride, and 2 parts of palladium catalyst is hydrogenated at a pressure of 10–50 p. s. i. of hydrogen. The reaction starts at room temperature and reaches 58° when complete. The reaction mass is filtered from the catalyst and poured into an excess of dilute ammonia. The reaction product which precipitates is dissolved in benzene, and the benzene solution is washed and distilled. Some p-phenetidine is recovered as the foreshot and 12 parts of 4-amino-4'-ethoxydiphenylamine then distill at 210–220° C. and a pressure of 3–4 mm. After crystallization from a mixture of benzene and petroleum ether it melts at 99° C. and is identical with the product obtained from p-nitrophenetole and aniline hydrochloride.

*Example 23*

A steel hydrogenation bomb is cooled with Dry Ice and charged with 120 parts of anhydrous hydrogen fluoride free from sulfur dioxide, 93 parts of aniline, 125 parts of p-nitrophenetole, and 5 parts of palladium catalyst. The charge is hydrogenated at 40° C. and a pressure of 200–300 p. s. i. On working up the charge, a small amount of 4-amino-4'-ethoxydiphenylamine is obtained.

*Example 24*

A charge of 41 parts of p-nitrotoluene, 70 parts of aniline hydrobromide, 80 parts of methanol and 3 parts of palladium catalyst is hydrogenated at 20° C. and at a pressure of 20–45 p. s. i. hydrogen. When the hydrogenation is finished the catalyst is removed by filtration and the filtrate is evaporated to dryness on a steam bath. The solid residue is slurried in dilute ammonia and the oil which precipitates is dissolved in benzene. The benzene solution is separated, dried and distilled. Aniline and p-toluidine are recovered from the first portion distilling over. Three (3) parts of 4-amino-4'-methyldiphenylamine distill between 170–190° C. at a pressure of 4 mm. It dissolves in sulfuric acid containing sodium nitrite with a deep blue color and forms a poorly soluble sulfate with dilute aqueous sulfuric acid.

*Example 25*

The hydrogenation is carried out in a steel shaker bomb. A charge of 85 parts diphenylamine, 137 parts p-nitrotoluene, 30 parts of water, and 5 parts palladium catalyst is put in the bomb cooled with Dry Ice. One hundred twenty (120) parts of anhydrous hydrogen fluoride, which contains no sulfur dioxide to poison the catalyst, is then added. The charge is hydrogenated at 40–80° C. and a pressure of 200–300 p. s. i. of hydrogen until the hydrogen absorption stops, after about four hours. The bomb is cooled in ice and the liquid contents are discharged into 1000 parts of cold water. The acidity of the dilution mass is adjusted to be just weakly acid to Congo red by adding 145 parts of 28% ammonia. The reaction product separates as an oil and is dissolved in 900 parts of benzene. The benzene solution is separated, filtered from the catalyst residue, washed, dried and distilled. Diphenylamine and p-toluidine are recovered first by distillation. Upon further distillation 23 parts of N-phenyl-N'-(p-methylphenyl) phenylene diamine are collected at 220–280° C. and a pressure of 3 mm. The product melts at about 90° C. and is soluble with a deep blue color in concentrated sulfuric acid containing traces of sodium nitrite. After a crystallization from 250 parts of methanol it is obtained melting at 146° C. Further crystallization does not change the melting point.

*Example 26*

Seven (7) parts of aniline hydrobromide are dissolved in 40 parts of methanol. Five (5) parts of freshly prepared p-anisylhydroxylamine are added to the well agitated solution over a period of 15 minutes. During this addition, the temperature is maintained at 23–29° C. by applying intermittent cooling. After about five minutes a yellow precipitate begins to form. The charge is agitated for two hours and then allowed to stand at room temperature over night. The precipitate is filtered, washed with alcohol and crystallized from a mixture of benzene and petroleum ether. The crystals melt to a cloudy mass at 116° C. and form a clear melt at 135° C., which melting point behavior is characteristic for 4,4'-dimethoxyazoxybenzene. It is further identified as such by a mixed melting point with a sample made by known methods, and by analysis. The filtrate from which these crystals has been removed is poured into water and a gummy product precipitates which shows no positive test for a diphenylamine when tested in sulfuric acid containing traces of sodium nitrite. A brown solution is formed, while in the presence of even traces of a diphenylamine, a deep blue solution would result.

Example 27

Para-anisylhydroxylamine freshly prepared by the reduction of 92 parts of p-nitroanisole is added to a solution of 52 parts aniline hydrobromide in 100 parts of methanol at room temperature and is hydrogenated in the presence of 3 parts of palladium catalyst. A pressure of 20–40 p. s. i. is employed. A reaction temperature of 65–75° C. is needed to finish the hydrogenation in three hours. The finished charge is filtered from the catalyst. The filtrate is poured into water and made alkaline with caustic. The oily precipitate which separates is dissolved in benzene and the benzene solution is washed, dried and distilled. Ten (10) parts of 4-amino-4'-methoxydiphenylamine are obtained upon distillation. It distills at 200° C. at 2 mm. pressure and melts at 99° C.

The nitrobody taking part in the reaction is preferably chosen from compounds having the formula:

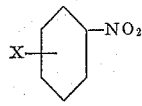

in which X represents a radical containing from 1 to 4 carbon atoms and selected from the group consisting of alkyl and alkoxy radicals. Examples of such compounds are p-nitroanisole, p-nitrophenetole, o-nitroanisole and p-nitrotoluene. Propoxynitrobenzene and butoxynitrobenzene may also be used. When nitro compounds substituted with alkoxy or alkyl radicals in a position which is ortho or meta to the nitro group are used, a benzidine rearrangement is apt to occur which results in the formation of a mixture of the desired diphenylamine with the corresponding aminodiphenyl. Higher yields are obtainable when p-substituted nitro compounds are used. Instead of using a substituted nitrobenzene, it is also possible to employ a hydroxylamine. Thus the same final product will be obtained by condensing a phenylamine under hydrogenating conditions with either p-nitroanisole or p-anisylhydroxylamine.

The phenylamines which may be used in this process are those having the formula:

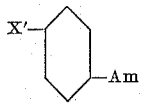

in which X' represents a member of the group consisting of hydrogen and alkoxy radicals containing from 1 to 4 carbon atoms and Am represents a member of the group consisting of amino, monoalkylamino containing from 1 to 4 carbon atoms, dialkylamino in which each alkyl contains from 1 to 4 carbon atoms, phenylamino and p-alkylphenylamino radicals in which the alkyl radicals contain from 1 to 4 carbon atoms. Examples of such compounds are aniline, p-anisidine, N-methylaniline, N-ethylaniline, N-dimethylaniline, N-diethylaniline, diphenylamine, N-n-butylaniline, and 4-methyldiphenylamine. In certain cases it is not necessary to add the amine as such to the charge, as it can be formed by the hydrogenation of the nitrobody. Thus 4-methoxy-4'-aminodiphenylamine may be formed directly by the hydrogenation of p-nitroanisole. In this case p-anisidine is formed by the reduction of a portion of the p-nitroanisole and condenses with the reduction product of additional p-nitroanisole to form the ultimate product.

The condensation takes place on the carbon atom of the phenylamine which is para to the amino group. Accordingly, when p-alkoxyphenylamines such as p-anisidine are employed in the reaction, the alkoxy group is split off during the condensation.

It is essential that the reaction be carried out under acidic conditions. A pH of 4 or lower must be maintained. Such a condition may be produced by using the phenylamine in the form of its salt with an inorganic acid, such as an amine hydrochloride, amine hydrobromide or amine sulfate. It is also permissible to add acids such as phosphoric, hydrochloric or hydrogen fluoride to the charge. The necessary acidity may also be obtained by the addition of salts which have an acidic reaction in aqueous solution. Aluminum sulfate, aluminum chloride and iron chloride may be used for this purpose.

The acids used, as well as all the other chemicals introduced, must be free of catalyst poisons. In some cases it may be necessary to remove catalyst poisons from acids which are not available in sufficiently pure form.

The condensation may be carried out in the presence of a variety of solvents. Preferred solvents are alcohols such as methanol and butanol. Acetic acid, thiophene-free benzene and pyridine are also suitable. The choice of the proper solvent is in general more a question of economics than of chemistry, as the solvent does not ordinarily take part in the reaction. Water is not a desirable solvent, since the hydrogenation of a nitrobody in a dilute mineral acid leads to the formation of aminophenols. Relatively small amounts of water can be tolerated in the methanol solvent, however, and a fairly concentrated aqueous solution of aluminum sulfate is an operable solvent. It will sometimes be advantageous to use as the solvent, the acid which promotes the condensation. Thus 85 percent phosphoric acid and 80 to 100 percent hydrofluoric acid may be used successfully in the absence of any other solvent or diluent.

The preferred catalysts for use in this process are platinum and palladium. Catalysts of this type deposited on suitable carriers such as carbon black or charcoal are resistant to acids, are active under acidic conditions, and are easily and economically recovered. The palladium or platinum may be added in the form of the oxide, in which case the free metal is formed during hydrogenation. The amount of catalyst required depends upon many factors, such as upon the efficiency of the agitation. From 0.1 to 5 percent by weight of catalyst metal, based on the weight of the reactants, will be sufficient.

The present condensation is, like hydrogenations in general, an exothermic reaction. Once the reaction temperature has been reached, it is not usually necessary to provide any further heating and, indeed, cooling may be necessary in some cases. The reductive condensation proceeds at the temperature at which hydrogenation begins, which often is essentially at room temperature. It is not necessary to heat the charge materially above the hydrogenation temperature. The temperature at which hydrogenation and condensation take place will depend upon the nature of the nitrobody and the purity of all products concerned and will usually be between 10° and 100° C. It is well known that compounds containing even minute traces of catalyst poisons will require much higher hydrogenation temperatures and pressures than when catalyst poisons are absent.

The condensation appears to be independent of the pressures so long as the hydrogen pressure is high enough to start the hydrogenation. The reaction proceeds at pressures as high as 600 p. s. i. and as low as 10 p. s. i. If sufficiently high speed agitation is provided, the reaction will proceed at essentially atmospheric pressure.

The substituted aminodiphenylamines prepared according to the process herein disclosed are useful as intermediates for azoic blue colors and for other chemical compounds. The process is simple, comprising essentially a single step and may be performed in conventional chemical equipment. The yields are high and the by-products formed are reusable or are valuable intermediates.

I claim:

1. The process of preparing a 4-aminodiphenylamine having the formula:

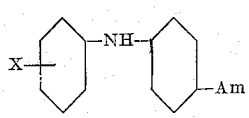

in which X represents a radical containing from 1 to 4 carbon atoms and selected from the group consisting of alkyl and alkoxy radicals, and Am represents a member of the group consisting of amino, monoalkylamino containing from 1 to 4 carbon atoms, dialkylamino in which each alkyl contains from 1 to 4 carbon atoms, phenylamino and p-alkylphenylamino radicals in which the alkyl radicals contain from 1 to 4 carbon atoms, which comprises hydrogenating a mixture of (1) a compound having the formula:

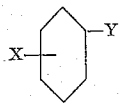

in which X has the significance above stated and Y represents a member of the group consisting of nitro and hydroxylamino radicals, and (2) a phenylamine having the formula:

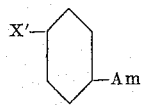

in which X' represents a member of the group consisting of hydrogen and alkoxy radicals containing from 1 to 4 carbon atoms and Am has the significance above stated, in a solution having a pH no higher than 4 and in the presence of a hydrogenation catalyst selected from the group consisting of palladium and platinum.

2. The process of preparing a substituted 4-amino-diphenylamine in which the ring not bearing the 4-amino radical carries an alkoxy substituent containing from 1 to 4 carbon atoms which comprises hydrogenating a mixture of aniline and a nitrobenzene ring-substituted with an alkoxy radical containing from 1 to 4 carbon atoms in a solution having a pH no higher than 4 and in the presence of a palladium hydrogenation catalyst.

3. The process of preparing a 4-amino-4'-alkoxydiphenylamine in which the alkoxy radical contains from 1 to 4 carbon atoms which comprises hydrogenating a mixture of aniline and a p-alkoxynitrobenzene in which the alkoxy radical contains from 1 to 4 carbon atoms in a solution having a pH no higher than 4 and in the presence of a palladium hydrogenation catalyst.

4. The process of preparing 4-amino-4'-methoxydiphenylamine which comprises hydrogenating a mixture of p-nitroanisole and aniline in a solution having a pH no higher than 4 and in the presence of a palladium hydrogenation catalyst.

5. The process of preparing a 4-amino-4'-alkoxydiphenylamine in which the alkoxy radical contains from 1 to 4 carbon atoms which comprises hydrogenating a mixture of aniline and a p-alkoxynitrobenzene in which the alkoxy radical contains from 1 to 4 carbon atoms in a solution having a pH no higher than 4 and in the presence of a platinum hydrogenation catalyst.

6. The process of preparing 4-amino-4'-methoxydiphenylamine which comprises hydrogenating a mixture of p-nitroanisole and aniline in a solution having a pH no higher than 4 and in the presence of a platinum hydrogenation catalyst.

7. The process of preparing a 4-alkylamino-4'-alkoxydiphenylamine which comprises hydrogenating a mixture of an N-alkylaniline in which the alkyl radical contains from 1 to 4 carbon atoms and a p-alkoxynitrobenzene in which the alkoxy radical contains from 1 to 4 carbon atoms in a solution having a pH no higher than 4 and in the presence of a palladium hydrogenation catalyst.

8. The process of preparing 4-n-butylamino-4'-methoxydiphenylamine which comprises hydrogenating a mixture of N-n-butylaniline and p-nitroanisole in a solution having a pH no higher than 4 and in the presence of a palladium hydrogenation catalyst.

9. The process of preparing a 4-amino-4'-alkoxydiphenylamine which comprises hydrogenating a mixture of a p-alkoxyaniline and a p-alkoxynitrobenzene, the alkoxy radical in each compound containing from 1 to 4 carbon atoms, in a solution having a pH no higher than 4 and in the presence of a palladium hydrogenation catalyst.

10. The process of preparing 4-amino-4'-methoxydiphenylamine which comprises hydrogenating a mixture of p-nitroanisole and p-anisidine in a solution having a pH no higher than 4 and in the presence of a palladium hydrogenation catalyst.

11. The process of preparing a 4-phenylamino-4'-alkoxydiphenylamine in which the alkoxy radical contains from 1 to 4 carbon atoms which comprises hydrogenating a mixture of diphenylamine and a p-alkoxynitrobenzene in which the alkoxy radical contains from 1 to 4 carbon atoms in a solution having a pH no higher than 4 and in the presence of a palladium hydrogenation catalyst.

12. The process of preparing N-phenyl-N'-p-methoxyphenylphenylenediamine which comprises hydrogenating a mixture of diphenylamine and p-nitroanisole in a solution having a pH no higher than 4 and in the presence of a palladium hydrogenation catalyst.

References Cited in the file of this patent

UNITED STATES PATENTS

| 2,041,782 | Semon | May 26, 1936 |
| 2,233,130 | Henke | Feb. 25, 1941 |

FOREIGN PATENTS

| 75,292 | Germany | May 11, 1894 |